(12) United States Patent
Jeon et al.

(10) Patent No.: US 11,862,409 B2
(45) Date of Patent: Jan. 2, 2024

(54) OPERATION APPARATUS FOR VEHICLE

(71) Applicant: SEOYON E-HWA CO., LTD., Anyang (KR)

(72) Inventors: Jong Hwan Jeon, Anyang (KR); Jung Jin Jeon, Siheung (KR)

(73) Assignee: SEOYON E-HWA CO., LTD., Anyang (KR)

( * ) Notice: Subject to any disclaimer, the term of this patent is extended or adjusted under 35 U.S.C. 154(b) by 0 days.

(21) Appl. No.: 17/934,201

(22) Filed: Sep. 22, 2022

(65) Prior Publication Data

US 2023/0135642 A1    May 4, 2023

(30) Foreign Application Priority Data

Oct. 30, 2021   (KR) .......................... 10-2021-0147499

(51) Int. Cl.
*H01H 13/14* (2006.01)
*B60R 16/02* (2006.01)
*H01H 13/04* (2006.01)
*H01H 13/10* (2006.01)

(52) U.S. Cl.
CPC ............. *H01H 13/14* (2013.01); *B60R 16/02* (2013.01); *H01H 13/04* (2013.01); *H01H 13/10* (2013.01)

(58) Field of Classification Search
CPC ........ H01H 13/14; H01H 13/04; H01H 13/10; H01H 9/287; H01H 13/86; H01H 9/226; B60R 16/02
See application file for complete search history.

(56) References Cited

U.S. PATENT DOCUMENTS

| 2015/0088336 | A1 | 3/2015 | Shin | |
|---|---|---|---|---|
| 2021/0020390 | A1* | 1/2021 | Betsuda | ................. H01H 9/16 |
| 2021/0053512 | A1* | 2/2021 | Perona | ............... H03K 17/9622 |
| 2021/0399656 | A1* | 12/2021 | Kobayashi | ............... H02N 2/18 |

FOREIGN PATENT DOCUMENTS

| JP | 2019-127139 A | 8/2019 |
|---|---|---|
| KR | 10-2015-0034018 A | 4/2015 |
| KR | 10-2019-0036714 A | 4/2019 |
| KR | 10-2277316 B1 | 7/2021 |

* cited by examiner

*Primary Examiner* — Lheiren Mae A Caroc
(74) *Attorney, Agent, or Firm* — Harvest IP Law, LLP

(57) ABSTRACT

Proposed is an operation apparatus for a vehicle that enables an appearing/disappearing of a button on a panel of a vehicle using a simplified mechanism. The operation apparatus includes: a first operation module and a second operation module, each capable of moving between a first position and a second position through an opening of a panel, and a drive unit for moving a selected one of the first operation module and the second operation module by using a single drive source.

13 Claims, 6 Drawing Sheets

OPERATION APPARATUS FOR VEHICLE

CROSS REFERENCE TO RELATED APPLICATION

The present application claims priority to Korean Patent Application No. 10-2021-0147499, filed Oct. 30, 2021, the entire contents of which is incorporated herein for all purposes by this reference.

BACKGROUND OF THE INVENTION

Field of the Invention

The present disclosure relates to an operation apparatus having a button used by a user to operate devices included in a vehicle, primarily from the inside of the vehicle.

Description of the Related Art

In general, vehicles are equipped with an array of devices related to driving to enhance comfort and convenience of a user (driver and/or passenger). These devices are controlled by buttons (or switches) that the user directly manipulates.

The buttons may be provided in various forms in an interior of the vehicle. In recent years, as vehicles have come equipped with more functions, the number of buttons disposed in the interior of the vehicle is gradually increasing. The increased number of buttons may give the user an impression that it is difficult and complicated to manipulate the buttons, or may lead to errors in the operation of the devices. In addition, cluttered interior with too many buttons may degrade the aesthetic quality of the interior of the vehicle.

SUMMARY OF THE INVENTION

Accordingly, the present disclosure has been made keeping in mind the above described problems, is intended to provide an operation apparatus for a vehicle that improves the visibility of a button and the aesthetic value of a vehicle by configuring the button to appear and disappear.

Another objective of the present disclosure is to provide an operation apparatus for a vehicle that enables appearing/disappearing of buttons with a simple mechanism.

Still another objective of the present disclosure is to provide an operation apparatus for a vehicle that enables reduction of the number of buttons and simplification of the structure.

The objectives of the present disclosure are not limited to those mentioned above, and other objectives not mentioned will be clearly understood by those skilled in the art from the following description.

In order to achieve the above objective, according to an embodiment of the present disclosure, there is provided an operation apparatus for a vehicle, the operation apparatus including: a panel provided in the vehicle; a first operation module and a second operation module, each capable of moving between a first position and a second position spaced apart from each other a front-back direction through an opening provided in the panel, and each having a button disposed at a front end thereof; and a drive unit having a common drive source, and for moving a selected one of the first operation module and the second operation module by transmitting a drive force of the common drive source.

The first operation module and the second operation module may be arranged in an orthogonal direction orthogonal to the front-back direction. The drive unit may include: a first contact block provided at a rear of the first operation module and a second contact block provided at a rear of the second operation module; a pressure block configured to move in the orthogonal direction between the first contact block and the second contact block by the drive source, and having a first tapered surface for pressing the first contact block to move forward and a second tapered surface for pressing the second contact block to move forward according to a moving direction; and an elastic member for giving a rearward elastic force to each of the first operation module and the second operation module.

The first tapered surface may be formed in a shape rearwardly inclined as the first tapered surface reaches one side of the pressure block from a center of the pressure block along the orthogonal direction, and the second tapered surface may be formed in a shape rearwardly inclined as the second tapered surface reaches another side of the pressure block from the center of the pressure block along the orthogonal direction.

The first contact block may have a first contact block tapered surface corresponding to the first tapered surface as a contact surface pressed by the first tapered surface, and the second contact block may have a second contact block tapered surface corresponding to the second tapered surface as a contact surface pressed by the second tapered surface.

According to an embodiment of the present disclosure, there is provided an operation apparatus for a vehicle, the operation apparatus including: a panel provided in the vehicle; a first operation module and a second operation module, each capable of moving between a first position and a second position spaced apart from each other in a front-back direction through an opening provided in the panel, and each having a button disposed at a front end thereof; and a drive unit having a common drive source, and for moving a selected one of the first operation module and the second operation module by transmitting a drive force of the drive source. The drive unit may include: a first contact block provided at a rear of the first operation module and a second contact block provided at a rear of the second operation module; a pressure block configured to move in the orthogonal direction between the first contact block and the second contact block by the drive source, and for pressing the first contact block and the second contact block according to a moving direction; and an elastic member for giving a rearward elastic force to each of the first operation module and the second operation module, wherein the first contact block and the second contact block may each have a tapered surface that induces forward movement of the first contact block and forward movement of the second contact block as a contact surface pressed by the pressure block.

The operation apparatus for a vehicle according to the embodiment of the present disclosure having the configuration as described above may further include: a sensor for detecting a user's action state for manipulating the button of the first operation module and the button of the second operation module; and a control unit that controls the drive unit on the basis of a detection signal from the sensor.

In addition, at least one of the first operation module and the second operation module may be moved a first distance or a second distance from the first position according to the action state to be located in a front region or a rear region of the second position, and depending on whether at least one of the first operation module and the second operation module is located in the front region or in the rear region, the button may be manipulated to perform a different first operating function and second operating function. Alternatively, at least one of the first operation module and the second operation module may be moved a first distance or a second distance from the first position according to the action state to be located in a front region or a rear region of the second position and may include a light source, and, depending on whether at least one of the first operation module and the second operation module is located in the front region or in the rear region, the button may be manipulated to perform a first operating function and second operating function and the light source may emit light of different colors.

The operation apparatus for a vehicle according to the embodiment of the present disclosure having the configuration as described above may further include: a finish skin that provides a finished surface covering a surface of the panel to block the opening, has flexibility, and is configured such that a part blocking the opening is moved together with the button of the first operation module and the button of the second operation module so that a shape of the finished surface is changed according to a movement of the first operation module and a movement of the second operation module.

In the operation apparatus for a vehicle according to the embodiment of the present disclosure having the configuration as described above, the surfaces of the buttons may be flush with the panel surface when the first operation module and the second operation module are located in the first position. The second position is located forward of the first position, and the buttons may protrude from the panel surface when the first operation module and the second operation module are located in the second position. At this time, the button of the first operation module and the button of the second operation module may protrude more when the first operation module and the second operation module are located in the front region among the front region and the rear region of the second position. Alternatively, the second position is rearward of the first position, and the buttons may be recessed from the panel surface when the first operation module and the second operation module are located in the second position. At this time, the button of the first operation module and the button of the second operation module may be recessed more when the first operation module and the second operation module are located in the rear region among the front region and the rear region of the second position.

Technical solutions will become more specific and clear from the examples, drawings, etc. described below. In addition, various solutions other than the aforementioned ones may be additionally suggested below.

According to an embodiment of the present disclosure, depending on the positions of operation modules, buttons may be in a state easily seen by a user (for example, a state in which a first operation module or a second operation module is located in a second position and the button protrude from the surface of a panel) or in a state difficult to be seen by the user (for example, a state in which the first operation module and the second operation module are all located in a first position and the surfaces of the buttons are flush with the surface of the panel). Accordingly, regarding the buttons, it is possible to provide better visibility and improved design.

In addition, according to an embodiment of the present disclosure, since the buttons appear and disappear by a common drive source, an appearing/disappearing drive mechanism for the buttons can be simplified, thereby reducing costs.

Furthermore, according to an embodiment of the present disclosure, since different functions are performed depending on the positions of the buttons, it is possible to reduce the number of buttons to be applied to the vehicle, thereby preventing the interior of a vehicle from being cluttered with many buttons.

The effects of the present disclosure are not limited to those mentioned above, and other effects not mentioned will be clearly understood by those skilled in the art from this specification and accompanying drawings.

BRIEF DESCRIPTION OF THE DRAWINGS

The above and other objectives and features of the present disclosure will be more clearly understood from the following detailed description when taken in conjunction with the accompanying drawings, in which.

DETAILED DESCRIPTION OF THE INVENTION

Hereinafter, embodiments of the present disclosure will be described with reference to the accompanying drawings.

The terminology used herein is for the purpose of describing particular embodiments only and is not intended to be limiting the present disclosure. As used herein, the singular forms are intended to include the plural forms as well, unless the context clearly indicates otherwise. It will be further understood that the terms "comprises", "includes", or the like when used herein, specify the presence of stated features, steps, operations, elements, components, or combinations thereof, but do not preclude the presence or addition of one or more other features, steps, operations, elements, components, or combinations thereof.

According to an embodiment of the present disclosure, an operation apparatus for a vehicle, a vehicle including the same, etc. may be provided. The operation apparatus may be used to operate various devices included in a vehicle. For example, devices operated by the operation apparatus (hereinafter referred to as a device to be operated) may include a navigation device, an air conditioning device, a sound device, a lighting device, a door lock device, a door opening or closing device, a motor/engine starting device, a driving speed control device, etc. Therefore, the vehicle according to the embodiment of the present disclosure may include the operation apparatus and at least one or more devices to be operated by the operation apparatus. The operation apparatus and the device to be operated may be electrically connected to each other.

The operation apparatus is installed in a vehicle and includes a button manipulated by a user. The operation apparatus may be provided to constitute a part of a vehicle. The part to which the operation apparatus is applied may be primarily an interior part of a vehicle. For example, the interior part may be a door trim, a ceiling panel, a dashboard, a console, a seat, an armrest, and the central part of a steering wheel (hub), etc. Embodiments of the present disclosure will be mainly focused on application of the operation apparatus to an interior part of a vehicle.

The structure and operation of the operation apparatus are exemplified in FIGS. 1 to 6.

Figure 1:
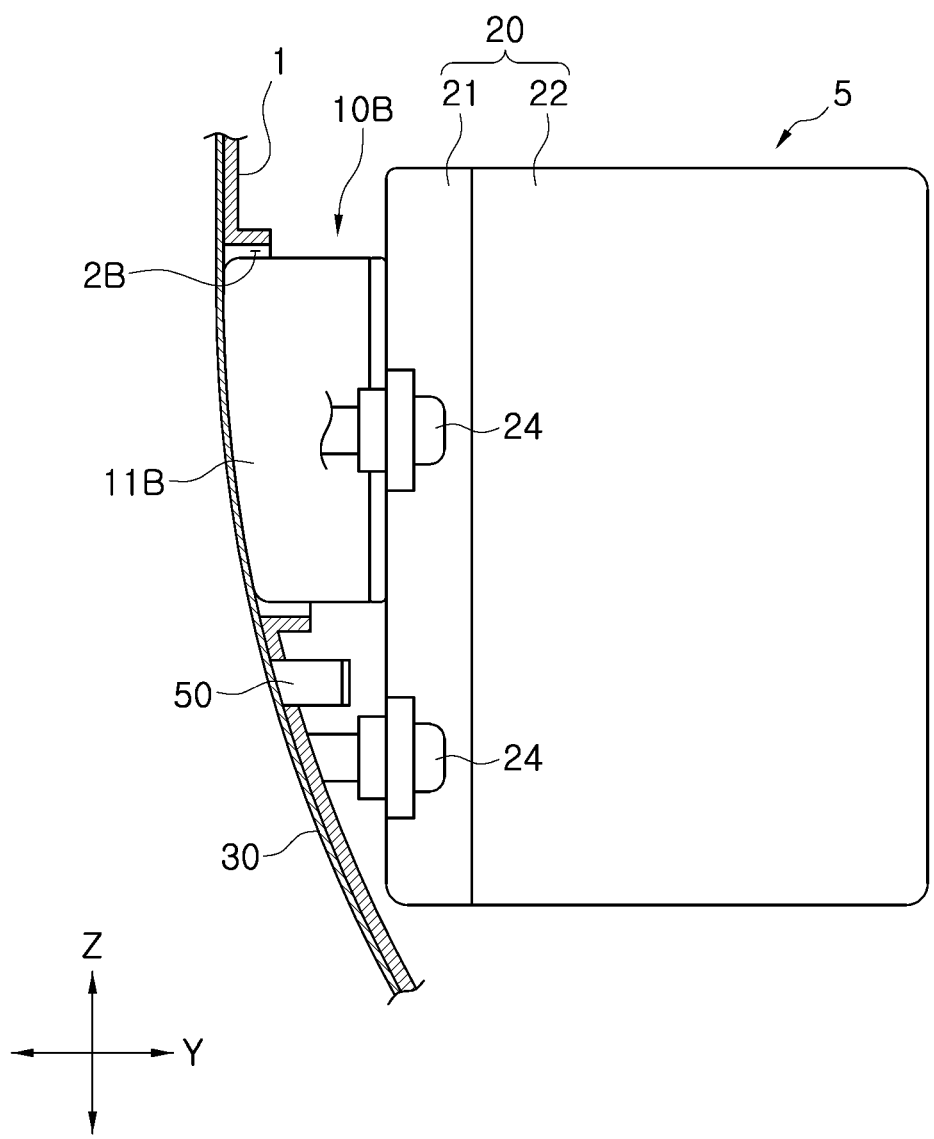
FIG. 1 is a side view illustrating an operation apparatus for a vehicle according to an embodiment of the present disclosure.

As illustrated in FIG. 1, the operation apparatus includes: a panel 1 constituting an interior part of a vehicle; and at least one operation module assembly 5 provided on the panel 1.

The panel 1 has a panel surface and a panel back surface. The panel 1 may be configured such that, depending on the type, shape, etc. of the interior part, the panel surface provides only a part of the surface of an interior part or the panel surface provides the entire surface of the interior part. The panel 1 has a first opening 2A (shown in FIGS. 4-6) and a second opening 2B. Each of these openings 2A, 2B is provided to penetrate the panel 1 through the panel surface and the panel back surface. The operation module assembly 5 includes a first operation module 10A (shown in FIGS. 4-6) and a second operation module 10B. The operation modules 10A and 10B respectively include buttons 11A (shown in FIGS. 4-6) and 11B manipulated by a user and are configured to operate, for example in a touch manner. The first button 11A, which is a button of the first operation module 10A, is disposed at the front end of the first operation module 10A, and the second button 11B, which is a button of the second operation module 10B, is disposed at the front end of the second operation module 10B, thus the first operation module 10A and the second operation module 10B have the front parts including the front ends composed of the button 11A and the button 11B, respectively. The first operation module 10A and the second operation module 10B are moved in the front-back direction (refer to the Y-axis direction) with respect to the first opening 2A and the second opening 2B, respectively, of the panel 1, and the buttons 11A and 11B that move together with the operation modules 10A and 10B, respectively, may appear and disappear through the first opening 2A and the second opening 2B, respectively. In order to make the buttons 11A and 11B appear and disappear, the buttons 11A and 11B may protrude in an embossed form with respect to the panel surface to reveal their positions and/or shapes (see FIGS. 5 and 6). The buttons 11A and 11B may be recessed in an engraved form rather than an embossed form with respect to the panel surface in order to reveal their positions and/or shapes. Depending on the implementation conditions, etc., the first opening 2A and the second opening 2B may be provided in one integrated form, and the first operation module 10A and the second operation module 10B may be moved in the front-back direction (refer to the Y-axis direction) with respect to the integrated opening.

The operation apparatus further includes a skin 30 covering the surface of the panel and the buttons 11A and 11B to provide a finished surface. The skin 30 may be sized to cover some or all of the panel surface including the openings 2A and 2B of the panel 1. The skin 30 is flexible so that when the buttons 11A and 11B are moved, each of the parts covering the buttons 11A and 11B (the parts that block the openings 2A and 2B) is deformed by the buttons 11A and 11B, respectively, and the shape of the finished surface may change. For example, parts covering the buttons 11A and 11B may be protruded by the buttons 11A and 11B in a generally flat shape of the finished surface (refer to FIGS. 5 and 6). When the finished surface is restored to the generally flat shape, the shapes of the buttons 11A and 11B are hidden, and thus it is possible to prevent the interior of the vehicle from being cluttered with the buttons 11A and 11B (see FIGS. 1 and 4).

The skin 30 may be bonded to the panel surface. In addition, the skin 30 may be precisely deformed and moved together with the buttons 11A and 11B when each of the parts covering the buttons 11A and 11B (the parts that block the openings 2A and 2B) is bonded to the surfaces of the buttons 11A and 11B, respectively. In particular, bonding of the skin 30 to the surface of the buttons 11A and 11B may be desired when the buttons 11A and 11B are retractable against the panel surface. The bonding of the skin 30 to the panel surface and/or the bonding of the skin 30 to the surfaces of the buttons 11A and 11B may be made firmly by an adhesive or the like.

As illustrated in FIGS. 1, 4, 5 and 6, the operation module assembly 5 further includes a base 21 disposed at a rear of the panel 1, and a base cover 22 detachably coupled to the base 21 at a rear of the base 21. The base 21 and the base cover 22 constitute the case 20. The base 21 and the base cover 22 coupled to each other are configured to provide an accommodating space 23 therebetween which is partially or wholly blocked from the outside. The base 21 may be mounted on the back side of the panel by means of fastening elements 24 such as bolts. The base 21 has a first through region 25A and a second through region 25B respectively facing the openings 2A and 2B of the panel 1. For example, the through regions 25A and 25B may be provided in the form of a hole. Depending on implementation conditions, etc., the first through region 25A and the second through region 25B may be provided in an integrated form.

The first operation module 10A and the second operation module 10B are, in a state of being inserted into the first through region 25A and the second through region 25B respectively of the base 21, provided to be movable between a first position and a second position spaced apart from each other in the front-back direction (refer to the Y-axis direction) through the opening 2 of the panel 1. The first position is a position where the buttons 11A and 11B are accommodated in the openings 2A and 2B, and the buttons 11A and 11B are formed such that the surfaces thereof are flush with the panel surface when the operation modules 10A and 10B are located in the first position. The second position is located forward of the first position and is a position where the buttons 11A and 11B protrude from the panel surface. When the operation modules 10A and 10B are located in the first position, the skin 30 may hide the buttons 11A and 11B by providing a finished surface in a generally flat shape (see FIGS. 1 and 4). When the operation modules 10A and 10B are moved to the second position so that the buttons 11A and 11B protrude from the panel surface, the skin 30 may be deformed into a shape in which parts covering the buttons 11A and 11B protrude by the buttons 11A and 11B to reveal the positions of the buttons 11A and 11B (see FIGS. 5 and 6). Depending on implementation conditions, etc., the second position may be a position in which the buttons 11A and 11B are recessed with respect to the panel surface while being located rearward of the first position. In this case, when the operation modules 10A and 10B are moved to the second position, the skin 30 may be deformed into a shape in which the parts covering the buttons 11A and 11B are recessed to reveal the positions of the buttons 11A and 11B.

The first operation module 10A and the second operation module 10B are arranged at regular intervals so as to be spaced apart from each other in the left-right direction (refer to the X-axis direction), which is one of the directions orthogonal to the front-back direction (refer to the Y-axis direction). The first opening 2A and the second opening 2B for the protruding and retracting of the first operation module 10A and the second operation module 10B, and the first through region 25A and the second through region 25B into which the first operation module 10A and the second operation module 10B are inserted are also arranged in the left-right direction (refer to the X-axis direction). For example, each of the first operation module 10A and the second operation module 10B, the first opening 2A and the second opening 2B, and the first through region 25A and the second through region 25B may be arranged in the up-down direction (refer to the Z-axis direction) as another direction orthogonal to the front-back direction, or in another direction other than the left-right direction and the up-down direction.

Although not shown, the first operation module 10A and the second operation module 10B may be precisely moved in the front-back direction (refer to the Y-axis direction) with respect to the openings 2A and 2B by a first guide and a second guide, respectively. For example, each of the guides may include guide pins provided on the base 21. The guide pins of the first guide for guiding the first operation module 10A and the guide pins of the second guide for guiding the second operation module 10B may be respectively arranged around the first through region 25A and the second through region 25B in the accommodating space 23. The first operation module 10A and the second operation module 10B each have guide holes into which the guide pins of the first guide are inserted and the guide pins of the second guide are inserted, and may be moved according to the guidance of the guide pins.

Figure 4:
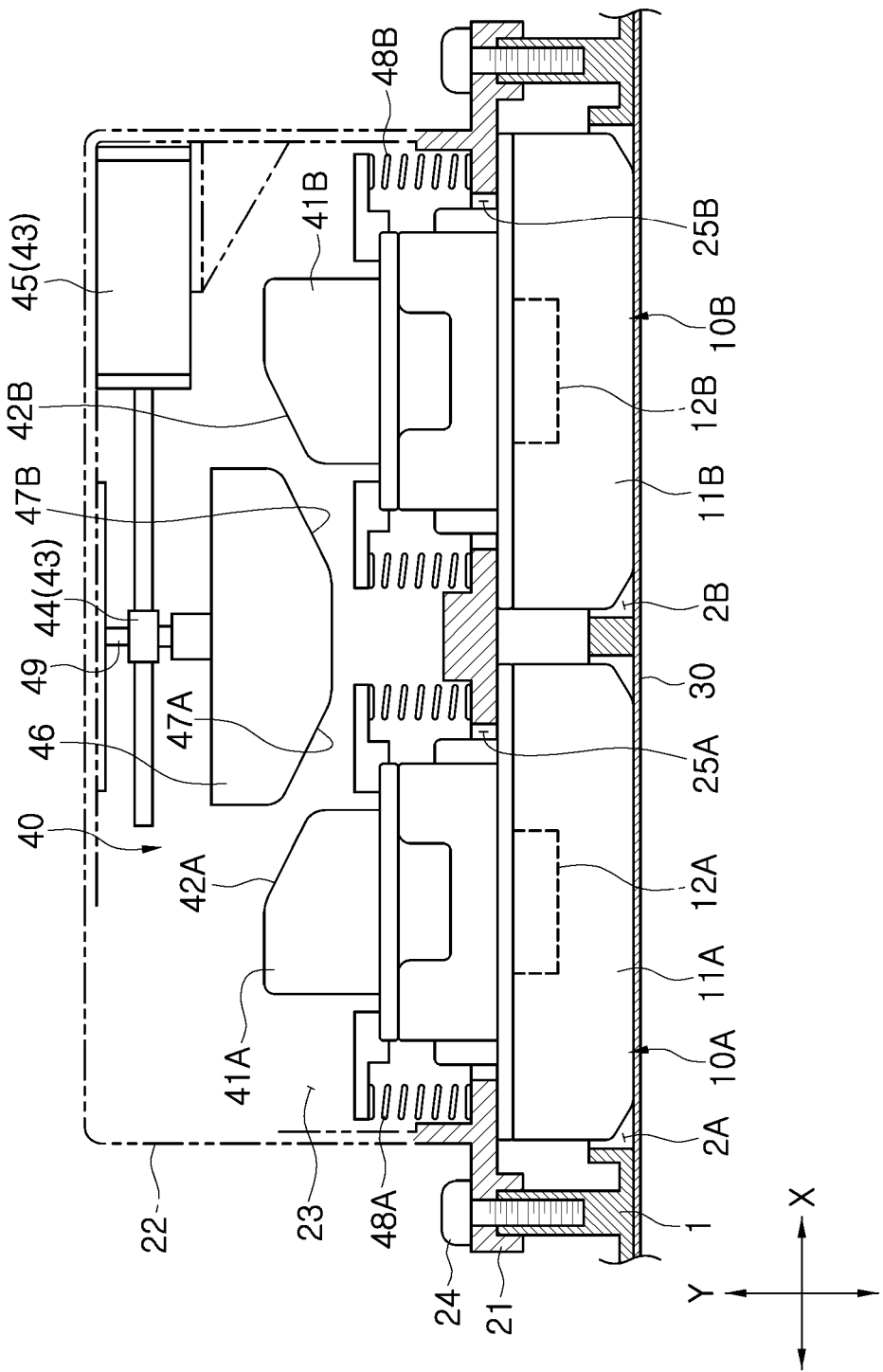
FIG. 4 is a plan view illustrating mainly the internal structure of the operation apparatus for a vehicle according to the embodiment of the present disclosure.
Figure 5:
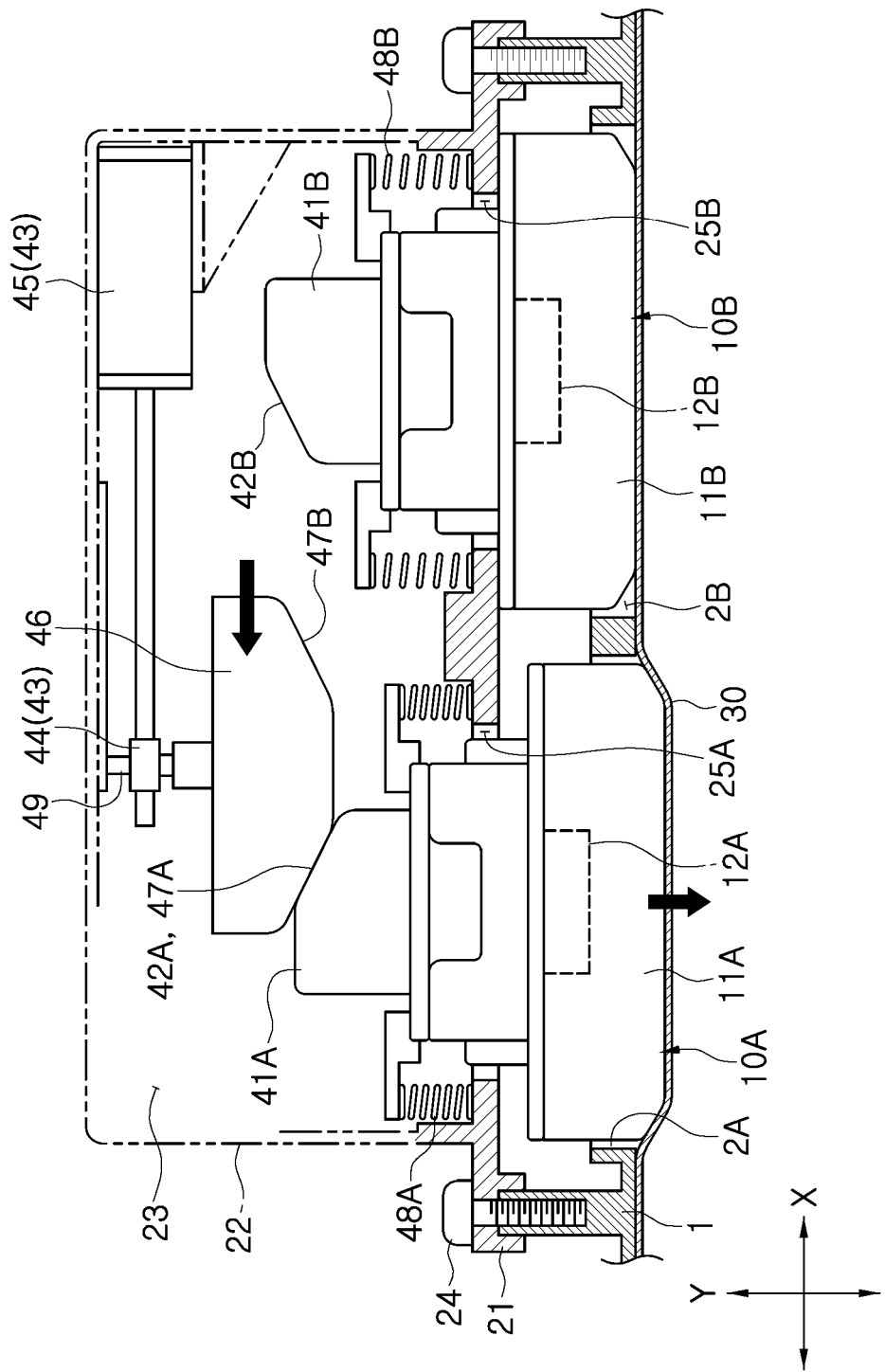
FIGS. 5 and 6 are plan views illustrating an operation of the operation apparatus according to the embodiment of the present disclosure.
Figure 6:
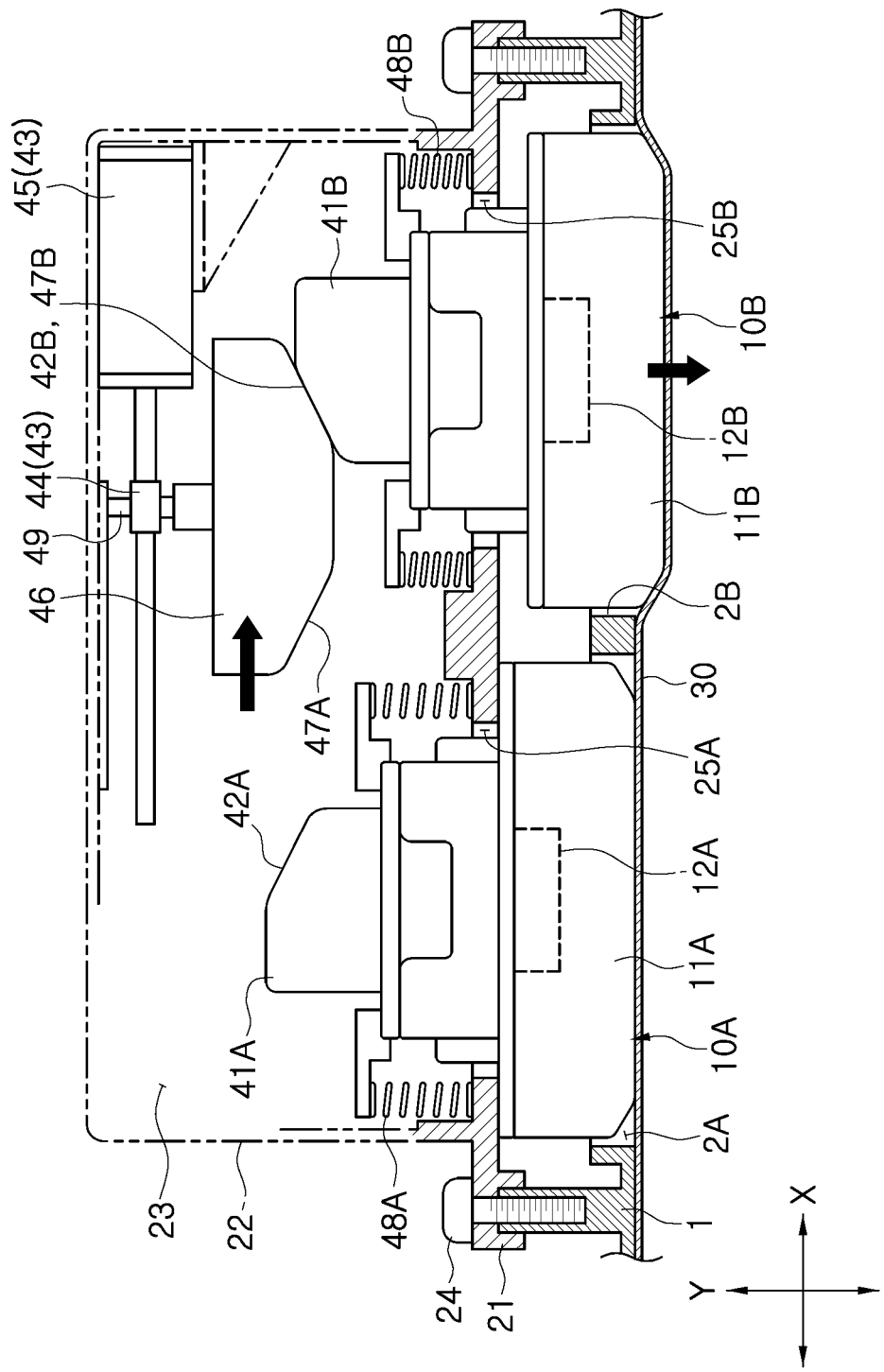

The operation module assembly 5 further includes a drive unit 40 for moving the operation modules 100A and 10B in the front-back direction with respect to the openings 2A and 2B to position the operation modules 10A and 10B in the first position or the second position. For reference, the drive unit 40 is schematically represented in FIGS. 4 to 6.

By the drive unit 40, the operation modules 10A and 10B may move forward from the first position to the second position. Accordingly, when the operation modules 10A and 10B are located in the second position, the buttons 11A and 11B protrude from the panel surface, and the skin 30 is deformed into a shape in which parts covering the buttons 11A and 11B protrude (see FIGS. 5 and 6). Of course, if the second position is a position located rearward of the first position and the buttons 11A and 11B are recessed with respect to the panel surface, the skin 30 may be deformed into a shape in which the parts covering the buttons 11A and 11B are recessed when the operation modules 10A and 10B are located in the second position. Conversely, by the drive unit 40, the operation modules 10A and 10B may be move backward from the second position to the first position. Accordingly, when the operation modules 10A and 10B are located in the first position, the surfaces of the buttons 11A and 11B are flush with the panel surface, and the skin 30 is restored to provide a generally flat finished surface (see FIGS. 1 and 4).

Figure 2:
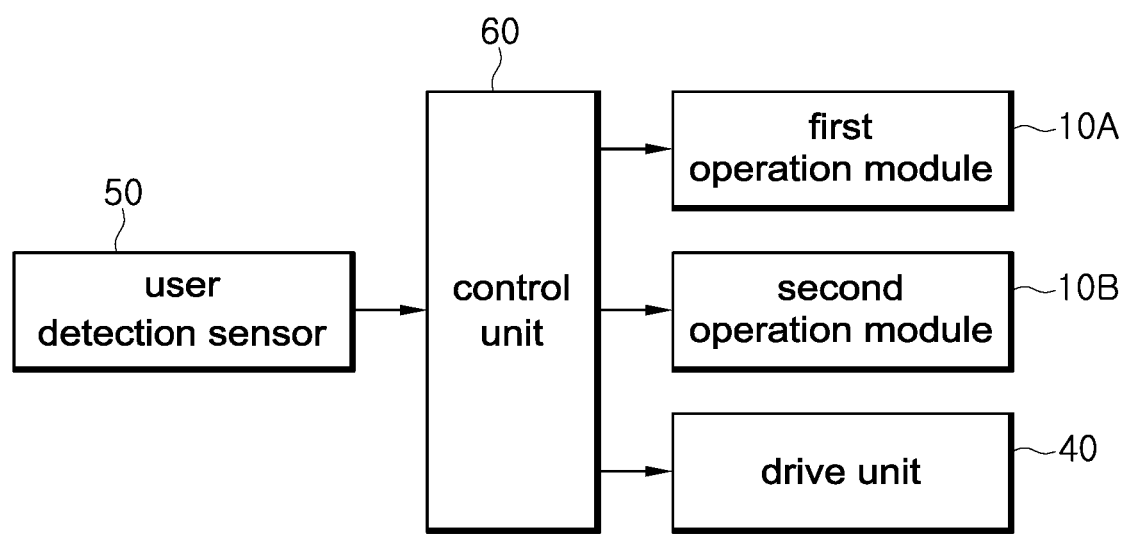
FIG. 2 is block diagram showing components of an operation apparatus for a vehicle according to an embodiment of the present disclosure.

Referring to FIGS. 1 and 2, the operation apparatus further includes: a user detection sensor 50 for detecting a user's action state for manipulating the buttons 11A and 11B; and a control unit 60 for controlling the operation modules 10A and 10B and the drive unit 40 on the basis of a detection signal from the user detection sensor 50.

As shown in FIG. 1, the user detection sensor 50 may be provided on the side of the openings 2A, 2B in the panel surface. The user detection sensor 50 may include at least one sensing element. For example, the user detection sensor 50 may include a first sensing element for detecting a user's action state for manipulating the first button 11A and a second sensing element for detecting a user's action state for manipulating the second button 11B, and the first and second sensing elements may be respectively disposed around the first opening 2A and the second opening 2B. Alternatively, the user detection sensor 50 may be configured to detect both the user's action state for manipulating of the first button 11A and the user's action state for manipulating of the second button 11B using a single sensing element. In the user detection sensor 50, the sensing element may be a proximity sensor that detects whether a user's body, such as a hand, is in proximity to the first button 11 and to the second button 11B. To be specific, the user detection sensor 50 may be an optical proximity sensor, a magnetic proximity sensor, an ultrasonic proximity sensor, a high frequency oscillation proximity sensor, a capacitive proximity sensor, or the like. For reference, among these sensors, the optical proximity sensor may include a light emitting element and a light receiving element receiving light from the light emitting element. The light emitting element may be a light emitting diode, and the light receiving element may be a phototransistor.

When a detection signal is input from the user detection sensor 50 while the operation modules 10A and 10B are located in the first position, the control unit 60 determines that the user attempts to manipulate the first button 11A or the second button 11B, and moves the first operation module 10A or the second operation module 10B from the first position to the second position by the control of the drive unit 40 (see FIGS. 5 and 6). When the button 11 is not manipulated for a preset time after the first operation module 10A or the second operation module 10B is located in the second position, the control unit 60 determines that the user does not want to manipulate the button 11A or the button 11B, and moves the first operation module 10A or the second operation module 10B from the second position to the first position by the control of the drive unit 40 (see FIGS. 1 and 4).

The operation modules 10A and 10B are kept in an inactive state in the first position and are kept in an active state in the second position. To switch the state of the operation modules 10A and 10B, the control unit 60 may set the operation modules 10A and 10B to be in an inactive state when the operation modules 10A and 10B are in the first position, and control the operation modules 10A and 10B to be in an active state when the operation modules 10A and 10B are in the second position. Due to the configuration that allows switching between active and inactive states with respect to the operation modules 10A and 10B, the user may manipulate the buttons 11A and 11B to operate a device to be operated when the operation modules 10A and 10B are located in the second position, and while the operation modules 10A and 10B are waiting in the first position, it is possible to prevent the buttons 11A and 11B from being actuated unintentionally by the user, thereby preventing a device to be operated from being unintentionally operated.

Figure 3:
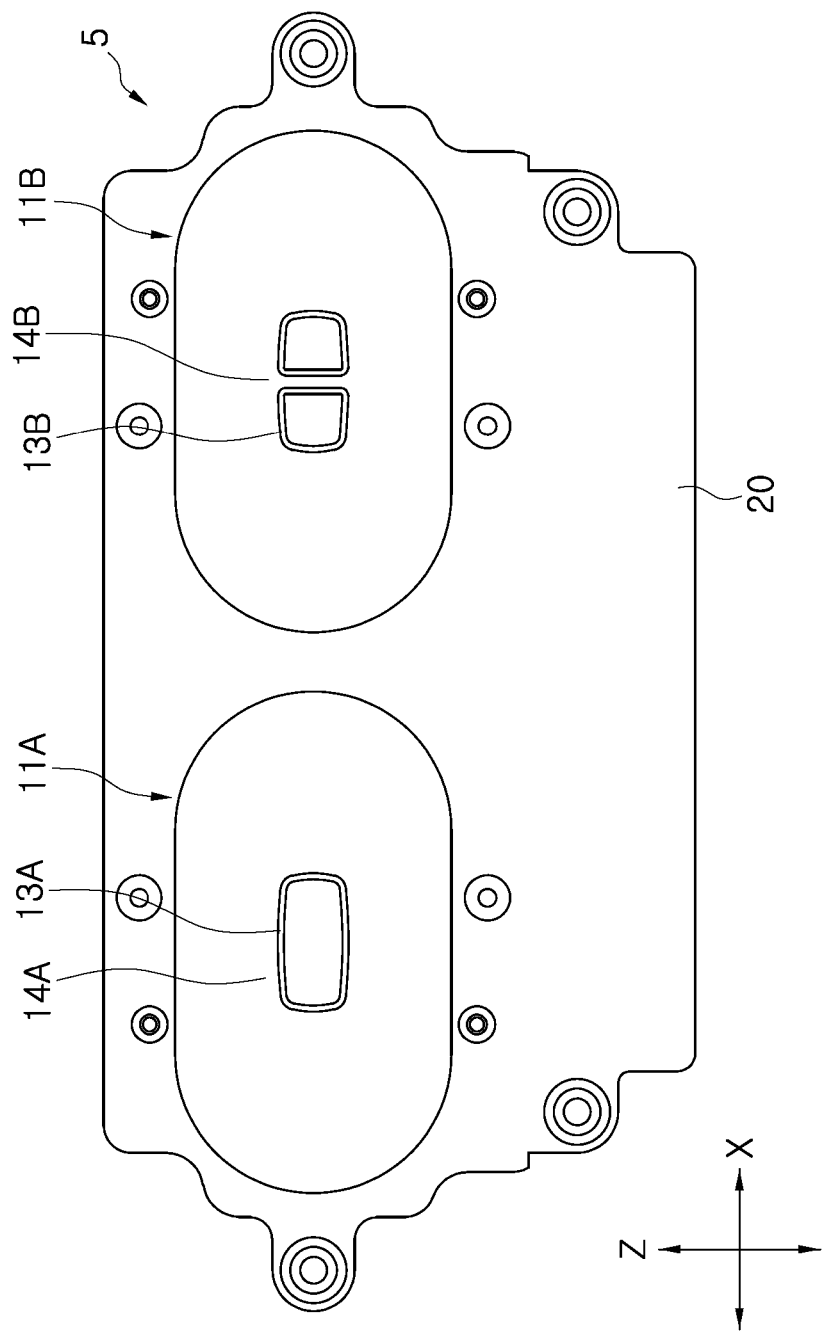
FIG. 3 is a front view illustrating an operation module assembly shown in FIG. 1.

As illustrated in FIGS. 4, 5 and 6, the first operation module 10A further includes a light source 12A for providing light, and the second operation module 10B includes a light source 12B for providing light. The light sources 12A and 12B may be built into the buttons 11A and 11B to emit the lights toward the surfaces of the buttons 11A and 11B. The light sources 12A and 12B may provide lights of various colors. For example, the light sources 12A and 12B may include at least one light emitting diode. As illustrated in FIG. 3, the first button 11A and the second button 11B are provided with light-transmitting areas 13A and 13B, respectively, through which lights from the light sources 12A and 12B pass and light-blocking areas 14A and 14B, respectively, that block lights from the light sources 12A and 12B on the surface thereof. Each of the light-transmitting areas 10A and 13B may be formed to have the shape of characters and/or figures indicating the function of the buttons 11A and 11B. In the operation modules 10A and 10B, the light sources 12A and 12B are maintained in an off state in the first position, and the light sources 12A and 12B are maintained in an on state in the second position. For this change of state of the light sources 12A and 12B, the control unit 60 may control the light sources 12A and 12B to be turned off when the operation modules 10A and 10B are located in the first position, and control the light sources 12A and 12B to be turned on when the operation modules 10A and 10B are located in the second position. Due to the configuration that allows switching between off and on states with respect to the light sources 12A and 12B, when the operation modules 10A and 10B are located in the second position, the active states of the operation modules 10A and 10B and the positions of the buttons 11A and 11B may be more accurately recognized by the user.

The skin 30 has a constant light transmittance so that light from the light sources 12A and 12B may pass through the skin 30, and although the user detection sensor 50 is provided around the openings 2A and 2B in the panel surface, the user's action state for manipulating the buttons 11A and 11B may be detected by the user detection sensor 50. For example, the skin 30 may be a sheet having light transmittance by being woven with fibers having flexibility.

As illustrated in FIGS. 4 to 6, the drive unit 40 is configured to have a common drive source 43, and to move the selected one of the first operation module 10A and the second operation module 10B in the front-back direction (refer to the Y-axis direction) by transmitting a drive force from the common drive source 43.

As previously described, the first operation module 10A and the second operation module 10B are arranged in the left-right direction (refer to the X-axis direction). The drive source 43 includes a moving body 44 that linearly moves in a left-right direction that is the same as the arrangement direction of the first operation module 10A and the second operation module 10B. The drive source 43 may be a linear actuator including the moving body 44. The moving body 44 may be moved more precisely in the left-right direction by a guide (X-axis guide, 49). The drive source 43 may further include a rotary motor 45. The rotation motor 45 has male thread formed on the outer periphery of a motor shaft, and the moving body 44 may have a female screw hole for screwing with the male thread formed on the motor shaft of the rotary motor 45. At this time, rotation of the moving body 44 may be restricted by the guide 49 guiding the left-right movement of the moving body 44 or a separate guide. Accordingly, the moving body 44 may be moved to the left or moved to the right according to the rotation direction of the rotary motor 45.

The drive unit 40 further includes a first contact block 41A, a second contact block 41B, a pressure block 46, a first elastic member 48A, and a second elastic member 48B.

The first contact block 41A is provided at the rear of the first operation module 10A, and the second contact block 41B is provided at the rear of the second operation module 10B. The first contact block 41A and the second contact block 41B are arranged in the same left-right direction (refer to the X-axis direction) as the arrangement direction of the first operation module 10A and the second operation module 10B. The pressure block 46 is disposed in the region between the first contact block 41A and the second contact block 41B, is moved in the left-right direction by the drive source 43, and comes into contact with the first contact block 41A to press the first contact block 41A or comes into contact with the second contact block 41B to press the second contact block 41B, depending on the moving direction. The first contact block 41A and the second contact block 41B may protrude rearward from the rear portion of the first operation module 10A and the rear portion of the second operation module 10B, respectively. The pressure block 46 may be coupled to the moving body 44 of the drive source 43 to move together with the moving body 44.

The first contact block 41A has a tapered surface 42A that induces forward movement of the first contact block 41A as a contact surface pressed by the pressure block 46 when in contact with the pressure block 46, and the second contact block 41B has a tapered surface 42B that induces forward movement of the second contact block 41B as a contact surface pressed by the pressure block 46 when in contact with the pressure block 46. The pressure block 46 has a first tapered surface 47A that presses the first contact block 41A when in contact with the first contact block 41A to move the first contact block 41A forward, and a second tapered surface 47B that presses the second contact block 41B when in contact with the second contact block 41B to move the second contact block 41B forward.

When the pressure block 46 is moved toward the first contact block 41A in the left-right direction (refer to the X-axis direction) by the drive source 43, the first tapered surface 47A comes into contact with the tapered surface 42A of the first contact block 41A, and when the pressure block 46 is moved toward the second contact block 41B in the left-right direction by the drive source 43, the second tapered surface 47B comes into contact with the tapered surface 42B of the second contact block 41B. The tapered surface 42A of the first contact block 41A and the first tapered surface 47A of the pressure block 46 are formed to have inclinations corresponding to each other, while the tapered surface 42B of the second contact block 41B and the second tapered surface 47B of the pressure block 46 are formed to have inclinations corresponding to each other. To be specific, in order to move the contact blocks 41A, 41B forward, the first tapered surface 47A of the pressure block 46 is formed in a shape rearwardly inclined at a constant angle as the first tapered surface 47A reaches the first contact block 41A side from a center of the pressure block 46 in the left-right direction, and the second tapered surface 47B of the pressure block 46 is formed in a shape rearwardly inclined at a constant angle as the second tapered surface 47B reaches the second contact block 41B side from center of the pressure block 46 in the left-right direction.

The first tapered surface 47A and the second tapered surface 47B may be disposed on the left front portion and right front portion of the pressure block 46, respectively. The tapered surface 42A of the first contact block 41A may be disposed opposite to the first tapered surface 47A at a rear portion of the first contact block 41A. The tapered surface 42B of the second contact block 41B may be disposed opposite to the second tapered surface 47B at the rear portion of the second contact block 41B. The tapered surface 42A of the first contact block 41A and the tapered surface 42B of the second contact block 41B, as well as the first tapered surface 47A and the second tapered surface 47B of the pressure block 46 are for converting the pressing direction of the pressure block 46 from the left-right direction (refer to the X-axis direction) to the front-back direction (refer to the Y-axis direction). Depending on implementation conditions, etc., the tapered surface 42A of the first contact block 41A and the tapered surface 42B of the second contact block 41B may be excluded from the drive unit 40, and the first tapered surface 47A and the second tapered surface 47B of the pressure block 46 may be excluded from the drive unit 40.

At least one first elastic member 48A is interposed between the first operation module 10A and the base 21 to give an elastic force to the first operation module 10A rearward along the front-back direction (refer to the Y-axis direction), while at least one second elastic member 48B is interposed between the second operation module 10B and the base 21 to give an elastic force to the second operation module 10B rearward along the front-back direction. For example, the first elastic member 48A and the second elastic member 48B may be coil springs.

The drive unit 40 configured as described above may stand by in a state in which the first tapered surface 47A is spaced apart from the tapered surface 42A of the first contact block 41A and the second tapered surface 47B is spaced apart from the tapered surface 42B of the second contact block 41B as the pressure block 46 is located in the middle of the region between the first contact block 41A and the second contact block 41B. At this time, the operation modules 10A, 10B are both moved rearwardly in the front-back direction by the action of the elastic members 48A, 48B, and are maintained in the first position (see FIG. 4).

In this state, when the drive source 43 moves the pressure block 46 in the left-right direction (refer to the X-axis direction) toward the first contact block 41A so that the first tapered surface 47A of the pressure block 46 presses the tapered surface 42A of the first contact block 41A, the first operation module 10A is moved forward (move from the first position to the second position) along the front-back direction (refer to the Y-axis direction), and the first elastic member 48A is compressed. This is the operation of the drive unit 40 by the control of the control unit 60 when the user detection sensor 50 detects a user's action state for manipulating the first button 11A. By this operation, the first operation module 10A is positioned in the second position (active state, the first light source is turned on), and the second operation module 10B remains in the first position as it is (inactive state, the second light source turned off) (see FIG. 5).

On the other hand, when the drive source 43 moves the pressure block 46 in the left-right direction (refer to the X-axis direction) toward the second contact block 41B so that the second tapered surface 47B of the pressure block 46 presses the tapered surface 42B of the second contact block 41B, the second operation module 10B is moved forward (move from the first position to the second position) along the front-back direction (refer to the Y-axis direction), and the second elastic member 48B is compressed. This is the operation of the drive unit 40 by the control of the control unit 60 when the user detection sensor 50 detects a user's action state for manipulating the second button 11B. By this operation, the first operation module 10A remains in the first position as it is (inactive state, the first light source is turned off), and the second operation module 10B is positioned in the second position (active state, the second light source is turned on) (see FIG. 6).

When the button 11A or 11B is not actuated for a set time after the first operation module 10A or the second operation module 10B is positioned in the second position, the pressure block 46 moved toward the first contact block 41A or the second contact block 41B in the left-right direction (refer to the X-axis direction) is moved to the middle of the region between the first contact block 41A and the second contact block 41B by the drive source 43, and the first operation module 10A or the second operation module 10B in the second position is moved rearward (move from the second position to the first position) along the front-back direction (refer to the Y-axis direction) by the restoring force of the elastic member 48A or 48B.

Meanwhile, the operation apparatus may have a front region and a rear region, in which the second position with respect to the first operation module 10A and the second position with respect to the second operation module 10B are positioned relatively forward and positioned relatively rearward, respectively. Of course, the rear region is located behind the front region. The operation apparatus is configured such that, the buttons 11A and 11B may protrude at different heights as the operation modules 10A and 10B are moved from the first position to a first distance or a second distance to be located in the front region or the rear region of the second position. That is, the buttons 11A and 11B may protrude to a second height when the operation modules 10A and 10B are located in the front region, and may protrude to a first height that is lower than the second height when the operation modules 10A and 10B are located in the rear region. In this case, if the second position is a position located rearward of the first position and a position where the buttons 11A and 11B are recessed with respect to the panel surface, the buttons 11A and 11B may be recessed to different heights (depths).

In this regard, the operation apparatus is configured such that, the operation modules 10A and 10B may be moved the first distance from the first position according to the detection signal of the user detection sensor 50 to be located in the rear region of the second position, and the buttons 11A and 11B may protrude to the first height, or the operation modules 10A and 10B may be moved the second distance from the first position according to the detection signal of the user detection sensor 50 to be located in the front region of the second position, and the buttons 11A and 11B may protrude to the second height. In addition, depending on whether the operation modules 10A and 10B are located in the rear region or in the front region, the buttons 11A and 11B may be manipulated to perform a first function and a second function as different operating functions. For example, a first device to be operated and a second device to be operated may be operated as respective operations corresponding to the first function and the second function of the first button 11A, and a third device to be operated and a fourth device to be operated may be operated as respective operations corresponding to the first function and the second function of the second button 11B. As another example, when the devices to be operated are a sound device and a lighting device, the volume increase and volume decrease of the sound device are performed as respective operations corresponding to the first function and the second function of the first button 11A, while the lighting device may be turned on and off as each operation corresponding to the first function and the second function of the second button 11B. With this configuration, since multiple functions may be performed with one button, the number of buttons required to be provided may be reduced.

To implement multiple functions with one button, the user detection sensor 50 may detect, on the basis of the user's action state for manipulating the first button 11A, whether a user's hand or the like that is in the proximity of the first button 11A is located in a first range or in a second range based on the first button 11A, and on the basis of the user's action state for manipulating the second button 11B, whether a user's hand or the like that is in the proximity of the second button 11B is located in a third range or in a fourth range based on the second button 11B. For example, the region of the first range and the region of the third range may be a range in which the user's hand or the like that is in the proximity of the first button 11A is at a relatively close distance based on the first button 11A and a range in which the user's hand or the like that is in the proximity of the second button 11B is at a relatively close distance based on the second button 11B, respectively, and the region of the second range and the region of the fourth range may be a range in which the user's hand or the like that is in the proximity of the first button 11A is at a relatively long distance based on the first button 11A and a range in which the user's hand or the like that is in the proximity of the second button 11B is at a relatively long distance based on the second button 11B, respectively. As another example, the first range and the second range may be an upper region and a lower region based on the first button 11A, and the third range and the fourth range may be an upper region and a lower region based on the second button 11B.

In this regard, when the user detection sensor 50 detects that the user's hand is positioned in the first range (or the second range) while the operation modules 10A and 10B are located in the first position, the control unit 60 may determine that the user is attempting to manipulate a device so that the first function (or the second function) of the first button 11A is performed and may move the first operation module 10A to the rear region (or the front region) of the second position by the control of the drive unit 40. Alternatively, when the user detection sensor 50 detects that the user's hand is positioned in the third range (or the fourth range), the control unit 60 may determine that the user is attempting to manipulate another device so that the first function (or the second function) of the second button 11B is performed and may move the second operation module 10B to the rear region (or the front region) of the second position by the control of the drive unit 40.

In addition, by the control unit 60, the operation modules 10A and 10B may be maintained in a state in which the light sources 12A and 12B emit lights of different colors depending on whether the operation modules 10A and 10B are located in the front region or in the rear region of the second position. The first light source 12A may emit the light of a first color and the light of a second color depending on whether the first operation module 10A is located in the rear region or in the front region, respectively, while the second light source 12B may emit the light of a third color and the light of a fourth color depending on whether the second operation module 10B is located in the rear region or in the front region, respectively. Due to this configuration, it is possible for the user to more accurately recognize whether the operation modules 10A and 10B are located in the front region or in the rear region.

The effects of the present disclosure is not limited to the disclosed embodiments and the accompanying drawings and may be variously modified by those skilled in the art without departing from the technical spirits of the present disclosure. In addition, the technical spirits described in the embodiments of the present disclosure may be implemented independently, or may be implemented in combination of two or more.

What is claimed is:

1. An operation apparatus for a vehicle, the operation apparatus comprising:
    a panel provided in the vehicle;
    a first operation module and a second operation module, each capable of moving between a first position and a second position spaced apart from each other in a front-back direction through an opening provided in the panel, and each having a button disposed at a front end thereof; and
    a drive unit having a common drive source, and for moving a selected one of the first operation module and the second operation module by transmitting a drive force of the common drive source, wherein the first operation module and the second operation module are arranged in an orthogonal direction orthogonal to the front-back direction, and the drive unit further comprises:
    a first contact block provided at a rear of the first operation module and a second contact block provided at a rear of the second operation module;
    a pressure block configured to move in the orthogonal direction between the first contact block and the second contact block by the drive source, and having a first tapered surface for pressing the first contact block to move the first operation module forward and a second tapered surface for pressing the second contact block to move the second operation module forward according to a moving direction; and
    an elastic member for giving a rearward elastic force to each of the first operation module and the second operation module.

2. The operation apparatus for a vehicle of claim 1, wherein the first tapered surface is formed in a shape rearwardly inclined as the first tapered surface reaches one side of the pressure block from a center of the pressure block along the orthogonal direction, and
    the second tapered surface is formed in a shape rearwardly inclined as the second tapered surface reaches another side of the pressure block from the center of the pressure block along the orthogonal direction.

3. The operation apparatus for a vehicle of claim 2, wherein the first contact block has a first contact block tapered surface that is contacted and pressed by the first tapered surface, and
    the second contact block has a second contact block tapered surface that is contacted and pressed by the second tapered surface.

4. The operation apparatus for a vehicle of claim 1, wherein each of the first contact block and the second contact block has a tapered surface that induces forward movement of each of the first contact block and the second contact block when pressed by the pressure block.

5. The operation apparatus for a vehicle of claim 4, further comprising:
    a sensor for detecting a user's action state for manipulating the button of the first operation module and the button of the second operation module; and
    a control unit that controls the drive unit on the basis of a detection signal from the sensor,
    wherein at least one of the first operation module and the second operation module is moved a first distance or a second distance from the first position according to the action state in order to be located in a front region or a rear region of the second position, and depending on whether at least one of the first operation module and the second operation module is located in the front region or in the rear region, the button is manipulated to perform different operating functions.

6. The operation apparatus for a vehicle of claim 4, further comprising:
- a sensor for detecting a user's action state for manipulating the button of the first operation module and the button of the second operation module; and
- a control unit that controls the drive unit on the basis of a detection signal from the sensor,
- wherein at least one of the first operation module and the second operation module is moved a first distance or a second distance from the first position according to the action state in order to be located in a front region or a rear region of the second position and includes a light source, and, depending on whether at least one of the first operation module and the second operation module is located in the front region or in the rear region, the button is manipulated to perform different operating functions and the light source emits light of different colors.

7. The operation apparatus for a vehicle of claim 4, further comprising:
- a finish skin that provides a finished surface covering a surface of the panel to block the opening, has flexibility, and is configured such that a part blocking the opening is moved together with the button of the first operation module and the button of the second operation module so that a shape of the finished surface is changed according to a movement of the first operation module and a movement of the second operation module.

8. The operation apparatus for a vehicle of claim 1, further comprising:
- a sensor for detecting a user's action state for manipulating the button of the first operation module and the button of the second operation module; and
- a control unit that controls the drive unit on the basis of a detection signal from the sensor,
- wherein at least one of the first operation module and the second operation module is moved a first distance or a second distance from the first position according to the action state in order to be located in a front region or a rear region of the second position, and depending on whether at least one of the first operation module and the second operation module is located in the front region or in the rear region, the button is manipulated to perform different operating functions.

9. The operation apparatus for a vehicle of claim 1, further comprising:
- a sensor for detecting a user's action state for manipulating the button of the first operation module and the button of the second operation module; and
- a control unit that controls the drive unit on the basis of a detection signal from the sensor,
- wherein at least one of the first operation module and the second operation module is moved a first distance or a second distance from the first position according to the action state in order to be located in a front region or a rear region of the second position and includes a light source, and, depending on whether at least one of the first operation module and the second operation module is located in the front region or in the rear region, the button is manipulated to perform different operating functions and the light source emits light of different colors.

10. The operation apparatus for a vehicle of claim 1, further comprising:
- a finish skin that provides a finished surface covering a surface of the panel to block the opening, has flexibility, and is configured such that a part blocking the opening is moved together with the button of the first operation module and the button of the second operation module so that a shape of the finished surface is changed according to a movement of the first operation module and a movement of the second operation module.

11. The operation apparatus for a vehicle of claim 1, further comprising:
- a sensor for detecting a user's action state for manipulating the button of the first operation module and the button of the second operation module; and
- a control unit that controls the drive unit on the basis of a detection signal from the sensor,
- wherein at least one of the first operation module and the second operation module is moved a first distance or a second distance from the first position according to the action state in order to be located in a front region or a rear region of the second position, and depending on whether at least one of the first operation module and the second operation module is located in the front region or in the rear region, the button is manipulated to perform different operating functions.

12. The operation apparatus for a vehicle of claim 1, further comprising:
- a sensor for detecting a user's action state for manipulating the button of the first operation module and the button of the second operation module; and
- a control unit that controls the drive unit on the basis of a detection signal from the sensor,
- wherein at least one of the first operation module and the second operation module is moved a first distance or a second distance from the first position according to the action state in order to be located in a front region or a rear region of the second position and includes a light source, and, depending on whether at least one of the first operation module and the second operation module is located in the front region or in the rear region, the button is manipulated to perform different operating functions and the light source emits light of different colors.

13. The operation apparatus for a vehicle of claim 1, further comprising:
- a finish skin that provides a finished surface covering a surface of the panel to block the opening, has flexibility, and is configured such that a part blocking the opening is moved together with the button of the first operation module and the button of the second operation module so that a shape of the finished surface is changed according to a movement of the first operation module and a movement of the second operation module.

* * * * *